United States Patent
Konagaya et al.

(10) Patent No.: US 9,664,223 B2
(45) Date of Patent: May 30, 2017

(54) SEIZURE PREVENTION BOLT

(71) Applicant: AOYAMA SEISAKUSHO CO., LTD., Niwa-Gun (JP)

(72) Inventors: Satoshi Konagaya, Niwa-Gun (JP); Kenya Yamada, Niwa-Gun (JP); Kazuhiro Koga, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 3 days.

(21) Appl. No.: 14/110,762

(22) PCT Filed: Apr. 15, 2013

(86) PCT No.: PCT/JP2013/061175
§ 371 (c)(1),
(2) Date: Oct. 9, 2013

(87) PCT Pub. No.: WO2013/179788
PCT Pub. Date: Dec. 5, 2013

(65) Prior Publication Data
US 2014/0314519 A1    Oct. 23, 2014

(30) Foreign Application Priority Data
Jun. 1, 2012    (JP) ................. 2012-125938

(51) Int. Cl.
F16B 35/00    (2006.01)
F16B 25/00    (2006.01)
F16B 35/04    (2006.01)

(52) U.S. Cl.
CPC ........ *F16B 25/0036* (2013.01); *F16B 35/007* (2013.01); *F16B 35/047* (2013.01)

(58) Field of Classification Search
CPC ... F16B 25/0036; F16B 35/047; F16B 35/007
(Continued)

(56) References Cited

U.S. PATENT DOCUMENTS 5,000,638 A * 3/1991 Essom .................... F16B 33/02
411/386
5,000,639 A * 3/1991 Hinkley .............. F16B 25/0084
411/386

(Continued)

FOREIGN PATENT DOCUMENTS

CN    102171464 A    8/2011
EP    1 087 149 A2   3/2001

(Continued)

OTHER PUBLICATIONS

European Search Report, European Application No. 13770400.3, dated Feb. 11, 2015 (6 pages).

(Continued)

*Primary Examiner* — Gay Spahn
*Assistant Examiner* — Flemming Saether
(74) *Attorney, Agent, or Firm* — Burr & Brown, PLLC

(57) ABSTRACT

There is provided a seizure prevention bolt capable of preventing seizure caused by oblique insertion as well as seizure caused by invasion of a foreign matter such as a spatter. An incomplete screw portion having an outer diameter d that is larger than an inner diameter $D_1$ of a female screw and smaller than $(D+D_1)/2$ is formed at a front end of a normal screw portion formed in a bolt shaft over one or more pitches, and a vertical groove for cutting out a foreign matter such as a spatter is formed in the incomplete screw portion. D in the above expression is a nominal diameter of the bolt.

5 Claims, 5 Drawing Sheets

(58) Field of Classification Search
USPC .............................. 411/386, 366.1, 417, 418
See application file for complete search history.

(56) References Cited

U.S. PATENT DOCUMENTS

| | | | |
|---|---|---|---|
| 5,419,667 A * | 5/1995 | Avgoustis | B21K 1/56 411/386 |
| 5,609,455 A * | 3/1997 | McKewan | F16B 35/047 411/386 |
| 6,120,227 A | 9/2000 | Murase et al. | |
| 6,347,917 B1 * | 2/2002 | Kato | B21K 1/56 411/308 |
| 6,908,270 B1 | 6/2005 | Iwata | |
| 2003/0185649 A1 | 10/2003 | Mizuno et al. | |
| 2005/0191152 A1 * | 9/2005 | Iwata | 411/386 |
| 2009/0035091 A1 * | 2/2009 | Geist | F16B 35/007 411/387.4 |
| 2009/0060676 A1 | 3/2009 | Murase et al. | |
| 2010/0068003 A1 * | 3/2010 | Wagner | B21H 3/02 411/386 |
| 2011/0200410 A1 | 8/2011 | Konagaya et al. | |

FOREIGN PATENT DOCUMENTS

| | | |
|---|---|---|
| JP | 62-080009 U | 5/1987 |
| JP | 02-176207 A1 | 7/1990 |
| JP | 06-313418 | 11/1994 |
| JP | 10-141343 A1 | 5/1998 |
| JP | 3336257 B2 | 10/2002 |
| JP | 2003-278729 | 10/2003 |
| JP | 2012-504731 A1 | 2/2012 |
| WO | 2006/134626 A1 | 12/2006 |
| WO | WO 2010/038446 A1 * | 4/2010 |

OTHER PUBLICATIONS

Chinese Office Action (With English Translation), Chinese Application No. 201380001258.7, dated Sep. 6, 2015 (7 pages).
International Search Report dated May 28, 2013.
Japanese Notice of Reasons for Revocation of the Patent for corresponding Japanese Patent No. 5957716 bearing a mailing date of Apr. 7, 2017.

* cited by examiner

PRIOR ART

SEIZURE PREVENTION BOLT

FIELD OF THE INVENTION

The present invention relates to a seizure prevention bolt suitably used in an automobile assembly line and the like.

BACKGROUND ART

In screwing a bolt into a female screw such as a nut, it is desired to accurately match an axis of the bolt with an axis of the female screw and insert the bolt into the screw. In the automobile assembly line and the like, however, in some cases a bolt is forcedly screwed into a female screw by use of a tool such as a power driver in a state where the axis of the bolt is slightly inclined. In such a case, a thread of the bolt fitted into a root part shifted by one pitch from a root part into which the female screw should be fitted, and when the thread is further fitted into the root part in a forced manner, seizure occurs, possibly leading to a problem of not being able to remove the bolt easily.

Since a lot of welding robots are used in the automobile assembly line and the like, a spatter inevitably generated during welding can enter the female screw and engage with the thread of the bolt, crushing the thread. When the bolt is forcedly screwed into the female screw into which the spatter has entered, seizure due to crushing of the thread can occur. Causes for the seizure of the bolt include well-known oblique insertion and invasion of a foreign matter such as the spatter.

Methods for preventing the seizure due to oblique insertion have been devised. According to a typical method, as shown in Patent document 1 of this Applicant, in the case where a guide is formed at a front end of a normal screw portion of the bolt and the bolt is diagonally inserted into the female screw, a front end of the guide is brought into contact with the female screw to correct the position of the bolt. Patent documents 2 and 3 also propose a seizure prevention bolt in which a thread is formed in a guide to improve the position correction effect. However, since the guide has a smaller diameter than the normal screw portion, a screw portion having a smaller diameter than the normal screw portion is inevitably formed at a connection portion between the normal screw portion and the guide, and seizure due to oblique insertion can occur at the screw portion having the smaller diameter.

Any of the conventional seizure prevention bolts described in Patent documents 1, 2, and 3 has no effect of preventing seizure caused by invasion of a foreign matter such as a spatter. For this reason, these bolts are unsatisfactory for screwing in work environments in which the welding spatter disperses, such as the automobile assembly line.

CONVENTIONAL TECHNIQUE DOCUMENT

Patent Document

Patent document 1: JP 10-141343 A
Patent document 2: Japanese Patent No. 3336257
Patent document 3: WO 2006/134626

SUMMARY OF THE INVENTION

Problems to be Solved by the Invention

Therefore, an object of the present invention is to provide a seizure prevention bolt that can solve the above-mentioned problem, prevent seizure caused by oblique insertion as well as seizure caused by invasion of a foreign matter such as a spatter, and therefore is suitable for use in work environments in which the welding spatter disperses, such as the automobile assembly line.

Means Adapted to Solve the Problems

To solve the above-mentioned conventional problem, a seizure prevention bolt according to the present invention is a bolt to be screwed into a female screw 20 having a nominal diameter D and an inner diameter $D_1$, wherein an incomplete screw portion having an outer diameter d that is larger than the inner diameter $D_1$ of the female screw and smaller than $(D+D_1)/2$ is formed at a front end of a normal screw portion formed in a bolt shaft over one or more pitches, and a vertical groove for cutting out a foreign matter is formed in the incomplete screw portion.

Preferably, given that the diameter of the foreign matter is $S_1$, a depth F of the vertical groove is $(2S_1+D-D_1)/2$ or greater. Preferably, a guide is formed at a front end of the incomplete screw portion. In this case, preferably, the vertical groove is formed up to a front end of the guide.

Effect of the Invention

In the seizure prevention bolt of the present invention, since the incomplete screw portion having the outer diameter d that is larger than the inner diameter $D_1$ of the female screw and smaller than $(D+D_1)/2$ is formed at the front end of a normal screw portion formed in a bolt shaft over one or more pitches, even when the bolt is obliquely inserted into the female screw, the thread of the incomplete screw portion does not forcedly engage with the thread of the female screw, preventing seizure. A reason for this will be described later.

Moreover, in the seizure prevention bolt of the present invention, as the vertical groove for cutting out the foreign matter such as a spatter is formed in the incomplete screw portion, the spatter that has entered the vertical groove is discharged through the vertical groove, or is cutout or crushed by the vertical groove. For this reason, seizure caused by oblique insertion as well as seizure caused by invasion of the spatter can be prevented.

DETAILED DESCRIPTION OF THE INVENTION

A preferred embodiment of the present invention will be described below.

Figure 1:
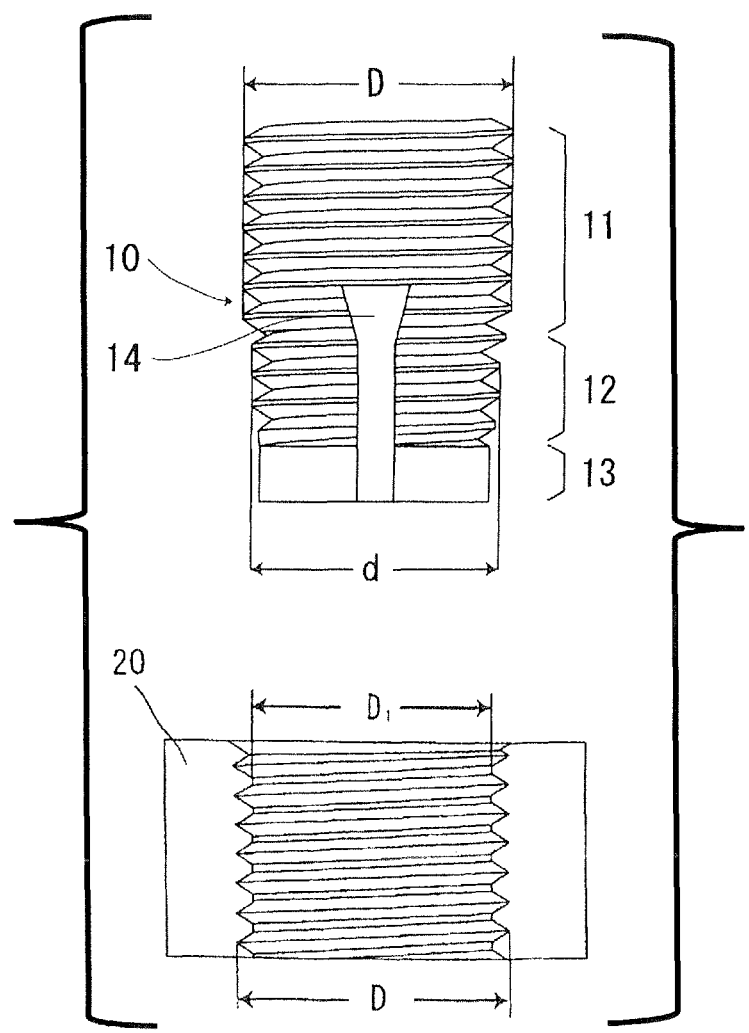
FIG. 1 An explanatory drawing of a main part of the present invention.

FIG. 1 is an explanatory drawing of a main part of the present invention, and shows a bolt 10 of the present invention and a female screw 20 into which the bolt 10 is screwed. In this embodiment, the female screw 20 is a nut, but is not limited thereto and may be a threaded hole formed in the member. Although not shown in FIG. 1, the bolt of the present invention has a head and a shaft as in conventional cases. The shaft includes a normal screw portion 11 and an incomplete screw portion 12 formed at a front end of the normal screw portion 11. In this embodiment, a guide 13 having a small diameter is formed at a front end of the incomplete screw portion 12.

The female screw 20 has a nominal diameter D and an inner diameter $D_1$. The nominal diameter D is common to the bolt 10 and the female screw 20, and as prescribed in JIS-B-0205, the nominal diameter D is equal to an outer diameter of a male screw of the bolt 10 (here, an outer diameter of the normal screw portion 11) and a root diameter of the female screw 20. The inner diameter $D_1$ of the female screw 20 corresponds to a root diameter of the normal screw portion 11 of the bolt 10. This relationship is general and is not specific to the present invention.

Specific features of the present invention are that an outer diameter d of the incomplete screw portion 12 formed at the front end of the normal screw portion 11 is larger than the inner diameter $D_1$ of the female screw 20 and is smaller than $(D+D_1)/2$, and that the incomplete screw portion 12 has a vertical groove 14 for cutting out the foreign matter such as the spatter.

Figure 2:
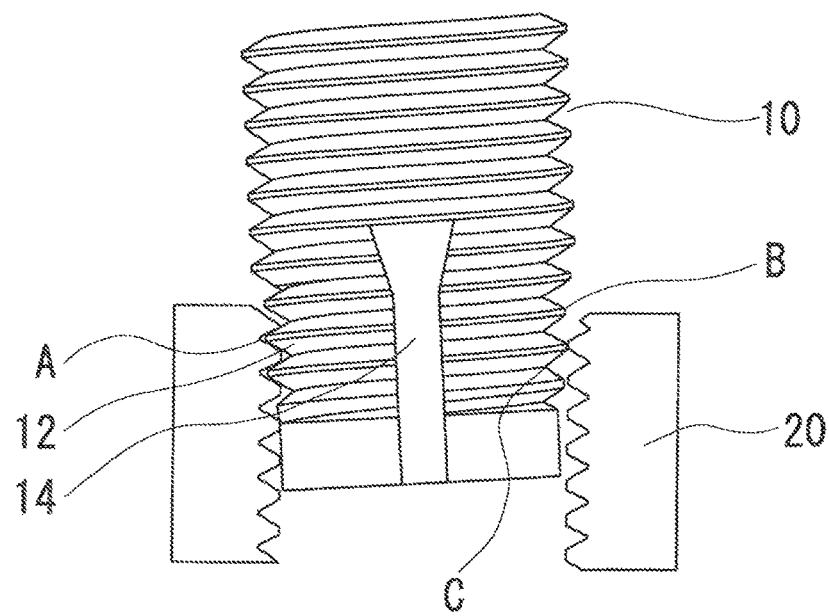
FIG. 2 An explanatory drawing showing the state where a bolt of the present invention is obliquely inserted.
Figure 3:
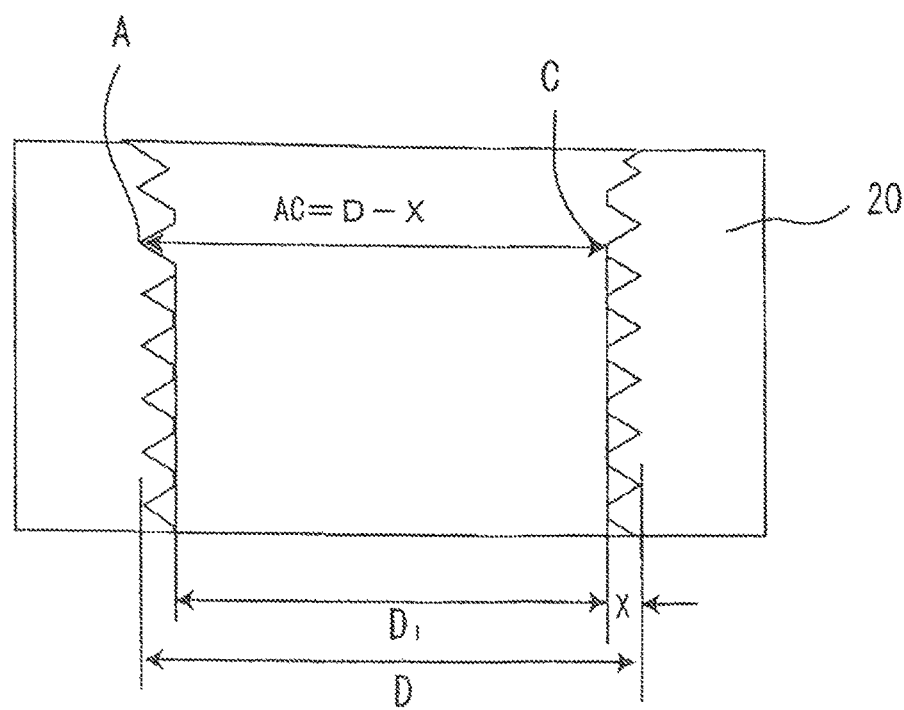
FIG. 3 an Explanatory Drawing Showing an Inner Diameter of a Female Screw.

First, the reason why the outer diameter of the incomplete screw portion 12 is set to be larger than the inner diameter $D_1$ of the female screw 20 and smaller than $(D+D_1)/2$ will be described. FIG. 2 shows the state where the bolt 10 of the present invention is obliquely inserted into the female screw 20, and a thread of the incomplete screw portion 12 engages with a thread of the female screw 20 at a point A. At this time, a distance AB between the point A and a point B as the top of the thread of the bolt 10, which is directly opposite to the point A, is the outer diameter d of the incomplete screw portion 12 and, according to the present invention, is set to be smaller than $(D+D_1)/2$. For the female screw 20, as shown in FIG. 3, a distance AC between the point A and a point C which is directly opposite to the point A is D–X, and since X is $(D-D_1)/2$, a following equation is satisfied: $AC=D-(D-D_1)/2=(D+D_1)/2$. That is, because the distance AB on the side of the bolt 10 is smaller than the distance AC on the side of the female screw 20 at all times, the point B on the bolt does not interfere with the point C on the side of the female screw 20, and the bolt can rotate around the point A.

Since the axis of the bolt 10 can be freely rotated around the point A engaged first, a clockwise moment in FIG. 2, which is generated by a force applied from a screwdriver to the bolt 10, puts the bolt 10 into the correct position, correctly moving ahead with fastening. Further, since the outer diameter d of the incomplete screw portion 12 is larger than the inner diameter $D_1$ of the female screw 20, the incomplete screw portion 12 of the bolt 10 does not pass through without engaging with the female screw 20. According to the present invention, the incomplete screw portion 12 is formed over one or more pitches. The reason for this is that, even when the bolt 10 is inclined in any direction, the incomplete screw portion 12 certainly contacts the female screw 20. To reliably achieve this effect, the incomplete screw portion 12 is preferably formed over two or three pitches. However, since the incomplete screw portion 12 does not function after completion of fastening, making the incomplete screw portion 12 too long is unpreferable.

Figure 4:
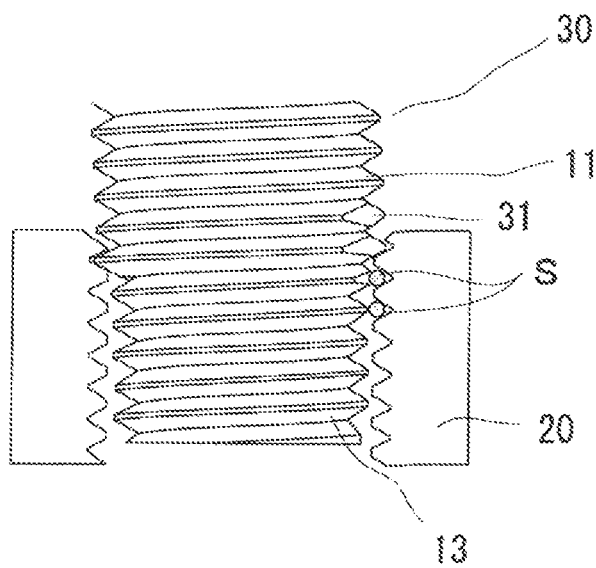
FIG. 4 An explanatory drawing showing a problem of a conventional bolt.

Next, the vertical groove 14 for cutting out the foreign matter such as the spatter, which is formed in the incomplete screw portion 12, will be described. Prior to this, seizure caused by spatters S will be described below. FIG. 4 shows a conventional bolt 30 that has a cutout groove 31 for removing a paint film at a lower end of the normal screw portion 11, and the guide 13 at a front end. In the case where a plurality of spatters S has entered the female screw 20 as shown in FIG. 4, the cutout groove 31 can cut out the first spatter S. However, the bolt is further fastened while rotating in the state where the cut spatter S is present in the cutout groove 31 and thus, hits against the second spatter. That is, since a piece of the cut spatter S decreases a space in the cutout groove 31, there is no margin left for the second spatter to be stored or escaped, and an excessive force to press the second spatter S is applied, crushing the female screw 20 and consequently causing seizure.

Figure 5:
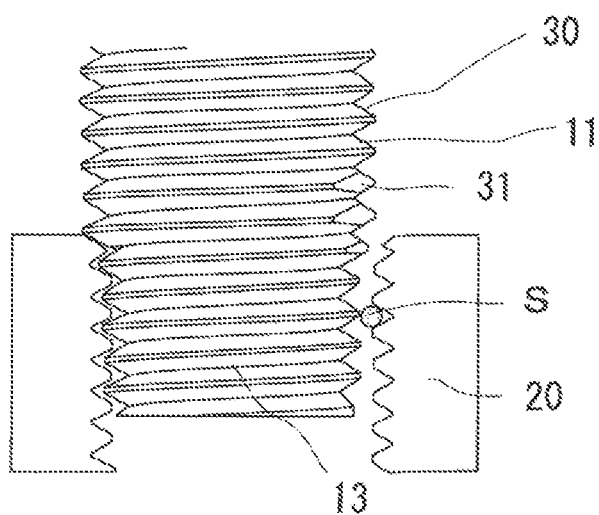
FIG. 5 An explanatory drawing showing a problem of the conventional bolt.

FIG. 5 shows the state where the guide 13 engages with the spatter S. Since the guide 13 and the female screw 20 have a clearance therebetween, no problem occurs in the initial stage of fastening. However, when fastening proceeds, the guide 13 may engage with the spatter S as shown in FIG. 5. Since the guide 13 has no function of cutting out the spatter S, when the bolt is forcedly fastened, the thread can be broken.

Figure 6:
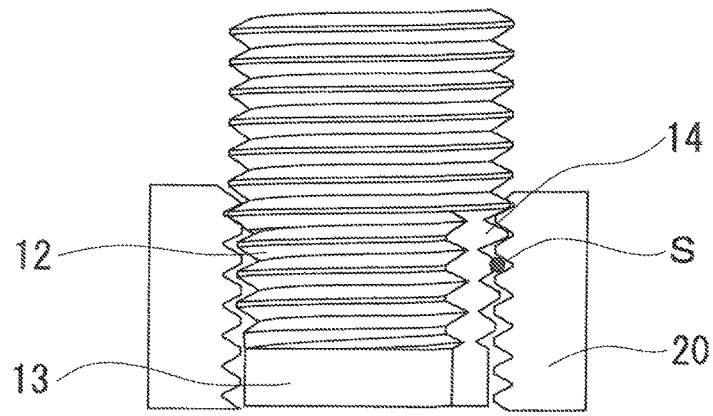
FIG. 6 An explanatory drawing showing relationship between the bolt of the present invention and a spatter.

To prevent seizure caused by the spatter S, according to the present invention, as shown in FIG. 6, the vertical groove 14 for cutting out the foreign matter such as the spatter S is formed in the incomplete screw portion 12. There are two reasons why the vertical groove 14 is formed in the incomplete screw portion 12. First, since the incomplete screw portion 12 is screwed into the female screw 20 before the normal screw portion 11 is screwed, by cutting out the spatter S in the incomplete screw portion 12, the thread of the normal screw portion 11 can be prevented from being damaged by the spatter S. In the conventional bolt shown in FIG. 4 and FIG. 5, since the cutout groove 31 is formed in the normal screw portion 11, the above-mentioned effect cannot be achieved. Second, since the incomplete screw portion 12 is smaller than the outer diameter D of the normal screw portion 11 as described above, by cutting out the spatter S in the incomplete screw portion 12, apiece of the foreign matter such as the spatter S can move in the space between the female screw 20 and the bolt 10 relatively freely, which hardly causes crushing of the thread and seizure caused by the crushing.

Figure 7:
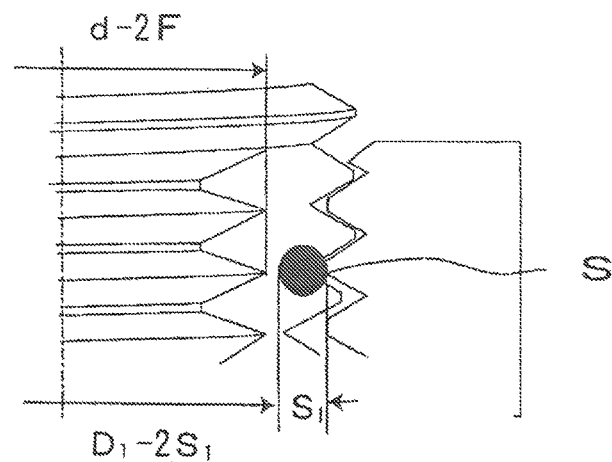
FIG. 7 An explanatory drawing showing dimensional relationship.

The depth of the vertical groove 14 must be set to reliably cut out the foreign matter such as the spatter S adhered to the inner surface of the female screw 20. FIG. 7 is an explanatory drawing showing the relationship. Given that the diameter of the foreign matter such as the spatter S is $S_1$ and the depth of the vertical groove 14 is F, the spatter diameter, that is, the diameter up to the inner end of the spatter S is $D_1-2S_1$. The cutout diameter, that is, the diameter up to the bottom surface of the vertical groove 14 is d–2F. Unless the spatter diameter is equal to or greater than the cutout diameter, the spatter S is completely engaged and cannot be cut out. Accordingly, these diameters need to satisfy the relation: $d-2F \leq D_1-2S_1$, leading to $F \geq (2S_1+d-D_1)/2$.

For the bolt of M14×1.5, which has been widely used in automobiles, the diameter of the adhered spatter S is about 1 mm at maximum. Given that d is 13.8 mm, $D_1$ is 12.6 mm, and the spatter diameter $S_1$ is 1 mm as the maximum value, F is 1.6 mm or greater. Accordingly, the depth of the vertical groove 14 is preferably, 1.6 mm or greater.

Figure 8:
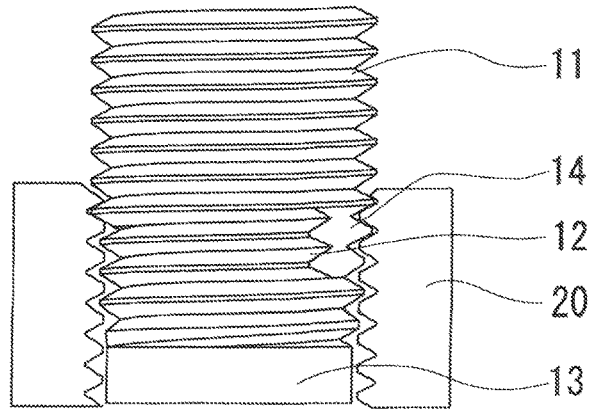
FIG. 8 An explanatory drawing showing a modification example of the present invention.

Although the vertical groove 14 is formed in only a part of the incomplete screw portion 12 as shown in FIG. 8, a piece of the cut spatter S can, in this case, remain in the lower portion of the vertical groove 14 and may not be discharged to the outside. For this reason, as shown in FIG. 6, it is preferred that the vertical groove 14 is formed up to the front end of the guide 13 to prevent clogging with the cut spatter S.

The vertical groove 14 may be formed at least one position in the circumferential direction. In this case, however, rolling is practically difficult and thus, the vertical grooves 14 are preferably at two or more positions. Depending on the diameter of the bolt, as the number of the vertical grooves 14 increases, the thread of the incomplete screw portion 12 decreases. Thus, the number of the vertical grooves 14 is preferably six at maximum.

Figure 9:
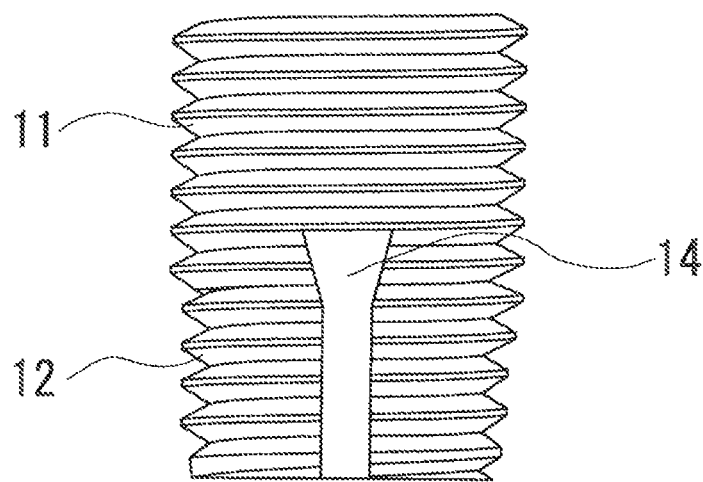
FIG. 9 An explanatory drawing showing another modification example of the present invention.
Figure 10:
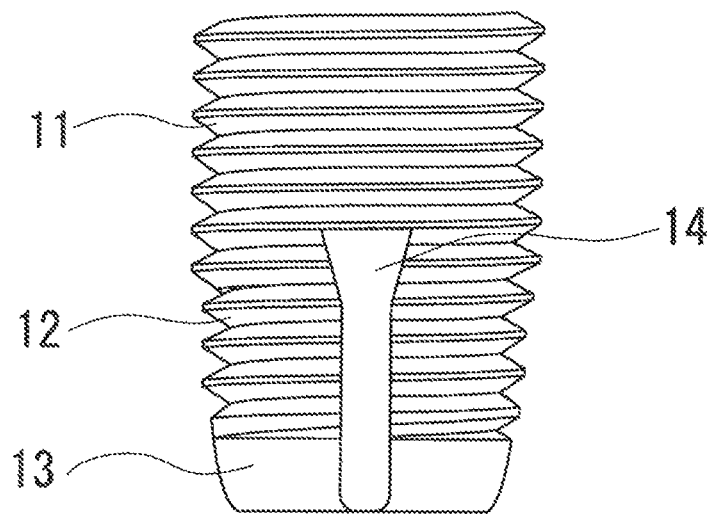
FIG. 10 An explanatory drawing showing another modification example of the present invention.

As described above, in the bolt 10 of the present invention, the guide 13 is not essential. FIG. 9 shows a bolt without the guide 13. FIG. 10 shows a guide 13 having a rounded side surface. The shape shown in FIG. 10 can advantageously improve the effect of correcting the position of the obliquely-inserted bolt 10.

As has been described above, the bolt of the present invention can prevent seizure caused by oblique insertion as well as seizure caused by invasion of the spatter, and therefore is suitable for use in work environments in which the welding spatter disperses, such as the automobile assembly line.

DESCRIPTION OF REFERENCE NUMERALS 10 bolt
11 normal screw portion
12 incomplete screw portion
13 guide
14 vertical groove
20 female screw
30 conventional bolt
31 cutout groove
S spatter

What is claimed is:

1. A seizure prevention bolt that is screwed into a female screw, the female screw comprising a thread having an inner surface with a nominal diameter D and an inner diameter $D_1$, wherein at an insertion side end of a bolt shaft a smaller diameter screw portion having a thread with straight flanks and an outer diameter d is formed by one pitch or more, the outer diameter d is larger than the inner diameter $D_1$ of the thread of the female screw and smaller than $(D+D_1)/2$ such that the smaller diameter screw portion is configured to put the bolt into a correct position by engaging the thread of the female screw, wherein the smaller diameter screw portion is formed to be continuous from a front end of a larger diameter screw portion formed in the bolt shaft such that the smaller diameter screw portion and the larger diameter screw portion have substantially the same thread profile and a root diameter of the smaller diameter screw portion is deeper than a root diameter of the larger diameter screw portion, and a vertical groove having a width and a depth is formed from the insertion side end of the bolt shaft through the smaller diameter screw portion to the larger diameter screw portion, wherein the width of the vertical groove is wider in the larger diameter screw portion than in the smaller diameter screw portion and the depth of the vertical groove is deeper than the root diameters of the smaller diameter screw portion and the larger diameter screw portion, and wherein when foreign matter is adhered to the inner surface of the thread of the female screw, the foreign matter is cut out by the vertical groove.

2. The combination of a seizure prevention bolt and a female screw according to claim 1, wherein, given that a diameter of the foreign matter is $S_1$, the depth F of the vertical groove is $(2S_1+d-D_1)/2$ or greater.

3. The combination of a seizure prevention bolt and a female screw according to claim 1, wherein a guide is formed at a front end of the smaller diameter screw portion.

4. The combination of a seizure prevention bolt and a female screw according to claim 3, wherein the vertical groove is formed up to a front end of the guide.

5. The combination of a seizure prevention bolt and a female screw according to claim 1, wherein at the insertion side end of the bolt shaft a last thread of the smaller diameter screw portion having the outer diameter d is in direct contact with a first complete thread of the female screw at an opening on a bolt inserting side of the female screw.

* * * * *